US005715672A

United States Patent [19]

Schockemoehl et al.

[11] Patent Number: 5,715,672

[45] Date of Patent: Feb. 10, 1998

[54] EXHAUST SILENCER PANEL FOR GAS TURBINE

[75] Inventors: Gene F. Schockemoehl, Claremore; Leland Matt Farabee, Owosso; Thomas Richard Mills, Broken Arrow; David W. Daniels, Sapulpa, all of Okla.

[73] Assignee: Braden Manufacturing, Tulsa, Okla.

[21] Appl. No.: 625,556

[22] Filed: Apr. 1, 1996

[51] Int. Cl.$^6$ .................................................. F02C 7/24

[52] U.S. Cl. ............................ 60/39.5; 181/218; 181/222

[58] Field of Search ............................ 60/39.5; 181/213, 181/217, 218, 219, 222

[56] References Cited

U.S. PATENT DOCUMENTS 2,810,449 10/1957 Coleman ................................ 181/218
3,159,238 12/1964 Shearer ................................ 181/213
3,185,252 5/1965 Lemmerman ................................ 181/217
3,688,865 9/1972 Smith ................................ 181/218

*Primary Examiner*—Louis J. Casaregola
*Attorney, Agent, or Firm*—Harness, Dickney & Pierce, P.L.C.

[57] ABSTRACT

An improved silencer panel construction for use in the exhaust gas stream of power generation equipment is described. The silencer panel has an outer periphery of U-shaped channel. Perforated webbing is attached within the outer periphery to strengthen the outer periphery and reduce thermal gradients building up within the web during operation. Acoustical insulation is provided within the silencer panel and held in place by screening as well as perforated cladding. A plurality of silencer panels are spaced apart within the silencer chamber to attenuate the noise produced by the exhaust gas stream.

3 Claims, 3 Drawing Sheets

Fig-1
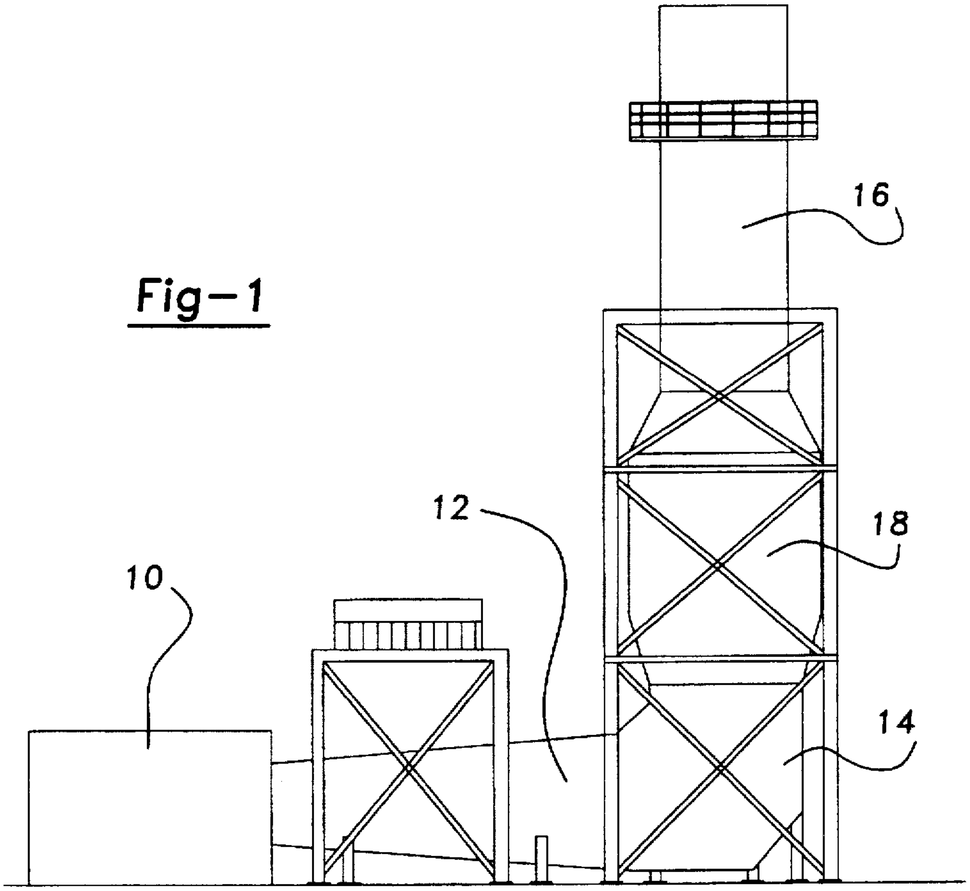
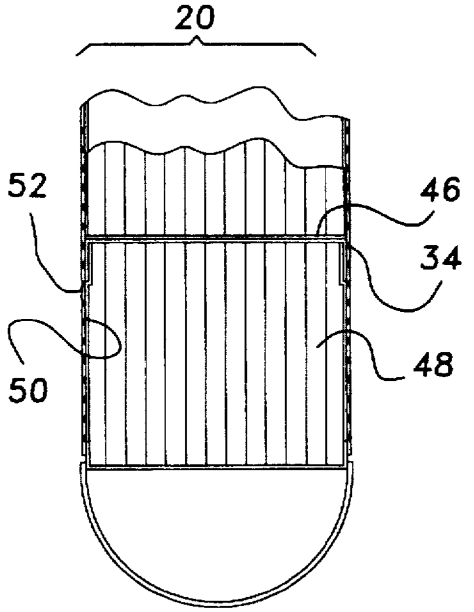
Fig-5
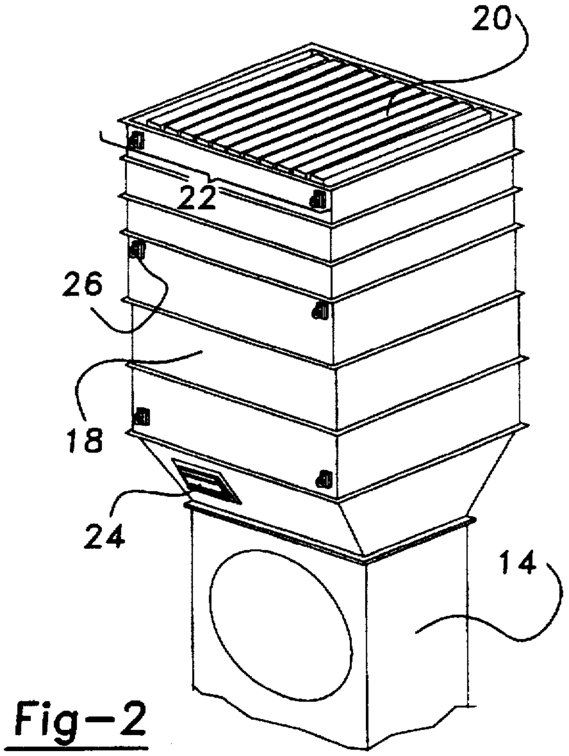
Fig-2

EXHAUST SILENCER PANEL FOR GAS TURBINE

AREA OF THE INVENTION

The present invention relates to panels within an exhaust stream that are intended to reduce the noise of the exhaust stream. Particularly, the invention is directed to panels for use in power generation equipment, these panels being placed in the exhaust stream of a gas turbine so as to reduce the noise level of that exhaust stream.

BACKGROUND OF THE INVENTION

The gas turbines used to produce electrical power emit an exhaust stream. That exhaust stream is of a relatively high noise level such that it is desirable to quiet the noise level to more acceptable levels. Traditionally, the quieting has been done by what is known as a "silencer" or a "silencing system" which serves to attenuate the sound. The silencing system generally consists of a silencer chamber attached to the exhaust plenum downstream from the gas turbine. Within the silencing chamber a series of silencer panels are arrayed. The silencer panels are generally of a rectangular shape and spaced apart. The size and thickness of the silencer panels as well as their spacing serve to determine how much sound attenuation is accomplished and at what frequencies.

Generally, the silencer panel is designed to be extremely rigid to take the stresses encountered in the gas turbine exhaust stream. These include a very turbulent gas stream and an extreme of temperatures ranging from sub zero, such as prior to start up in a cold climate, to 1,250° F., when the system reaches operating temperature. Likewise, the system can cycle through these temperature extremes such as when the gas turbine is shut down for maintenance. Because of the extremes of temperature, the silencer panel expands and contracts. The silencer panel is full of acoustical insulation which also acts as a thermal insulator to the internal structure of the panel. Therefore, the interior of the panel expands and contracts at different rate than the exterior. This can cause high localized stresses and consequently, a short life expectancy for the silencer panel.

The silencer panels have typically been made out of stainless steel such as a ASTM type 409. Newer technology for gas turbines has resulted in higher firing temperatures. These higher firing temperatures have required different material to take the higher temperatures. For example, austenitic stainless steel is often used in place of type 409 stainless steel. The austenitic stainless steel has a higher thermal coefficient of expansion and hence, accentuates the localized thermal stresses during cycling of the system, and with current designs would be expected to lead to an even shorter life span for the silencer panels.

BRIEF DESCRIPTION OF THE INVENTION

The present invention describes a new silencer panel design that reduces the problems of localized stresses throughout the silencer panel. This is accomplished by utilizing a lightweight framework to make up the silencer panel. The silencer panel is generally constructed from a stainless steel frame that generally defines the outer periphery of the silencer panel. That framework is tied together by internal (within the periphery) webbing welded welded to the inside of the frame. Sections of acoustical insulation are placed within the framework. Septums in the form of e.g. wire mesh can be placed adjacent to the webbing to prevent the insulation from shifting through the perforations of the webbing during use. Preferably the septum is free floating, i.e., not tied to the frame. Cladding in the form of perforated stainless steel sheets is then placed over the assembly and attached to the framework to retain the insulation within the framework. The silencer panel is then mounted within the silencer chamber by a variety of means, such as suspension. Therefore, the silencer accomplishes the objectives of being able to take the localized stresses due to thermal expansion and contraction without internal breakdown of the silencer panel for longer periods of time, translating into longer service life, fewer shutdowns and reduced costs.

BRIEF DESCRIPTION OF THE DRAWINGS

FIG. 1 is a schematic representation of a power generation system.

FIG. 2 is a perspective view of the silencer chamber connected to an exhaust plenum and containing a plurality of silencer panels.

FIG. 5 is a cross section taken through line 5—5 of FIG. 4.

DETAILED DESCRIPTION OF THE INVENTION

Figure 3:
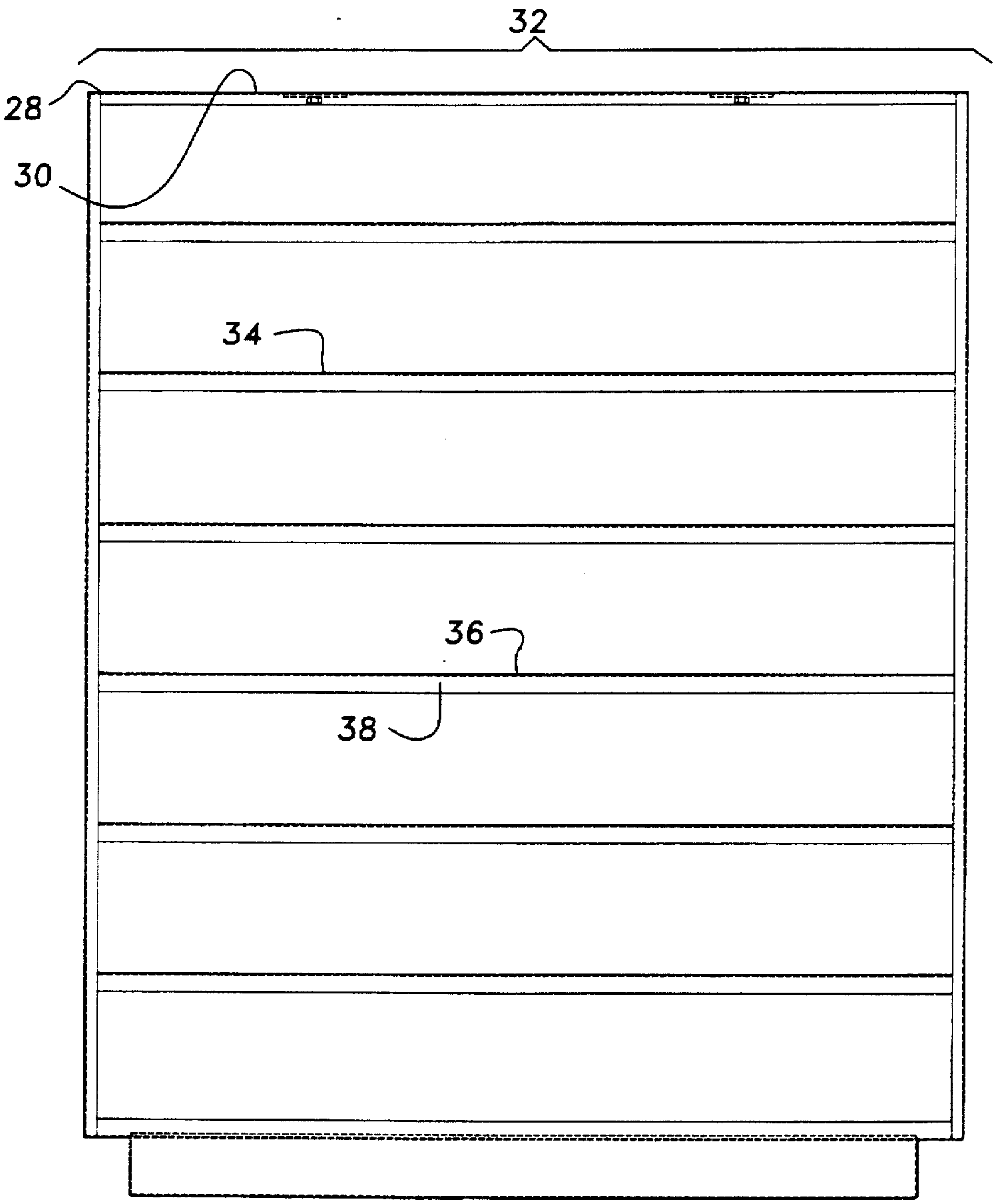
FIG. 3 is a perspective view of a partially assembled silencer panel according to the present invention.

FIG. 1 shows a typical power generation system. The gas turbine 10 exhausts to a diffuser 12. The exhaust stream continues on through an exhaust elbow 14 up a stack 16. Part of the stack shown has a silencer chamber 18. The silencer chamber 18 can be located in the vertical exhaust stack of the power plant or can be located along horizontal ducting.

As shown in FIG. 2, the exhaust chamber 18 contains a plurality of silencer panels 20 arrayed parallel to the exhaust flow (vertically upwards in FIGS. 1 and 2). The silencer panels are spaced apart from one another to form an array 22 allowing exhaust flow between panels.

The panels are designed to extend across the width of the chamber 18 and arrayed across substantially the depth of the chamber. The width of the panels, along with the spacing between panels, is designed to attenuate the noise of the exhaust stream. The width and spacing determines how much attenuation is achieved and at what frequency. The silencer panels act as baffles in the exhaust stream, and the acoustical insulation within the panels muffles and attenuates the sounds. The silencer panels are intended to maintain their integrity to continue to act as baffles and to continue to contain the acoustic insulation. The panels are subjected to high thermal cycling in a corrosive atmosphere of exhaust byproducts, as well as forces generated by a high velocity turbulent exhaust stream.

The chamber 18 is also equipped with an access door 24 for inspection and/or service functions. In addition, lifting lugs 26 are attached to the chamber so as to allow installation of a preassembled unit and/or manipulation during servicing. The silencer chamber itself can be made of ¼" thick A36 carbon steel plate for an outer casing and be insulated with known insulation material such as expanded ceramic fiber or basalt fiber or fiberglass which itself is lined (internally) by for example, 11 or 12 gauge stainless steel liner.

The silencer panels are mounted within the chamber by various means. The panels can be placed in an internal ridge at the edge of the silencer chamber (not shown) which will restrict their movement. This is especially preferred in the silencer chambers running along horizontal ducts where the exhaust chamber is horizontal. In situations such as shown in FIG. 2 where the exhaust stream is vertical, the silencer panels can also be affixed by pins in the exhaust stream. In addition, as further discussed below, the silencer panels may be equipped with suspension lift points for ease of transport and installation.

Figure 6:
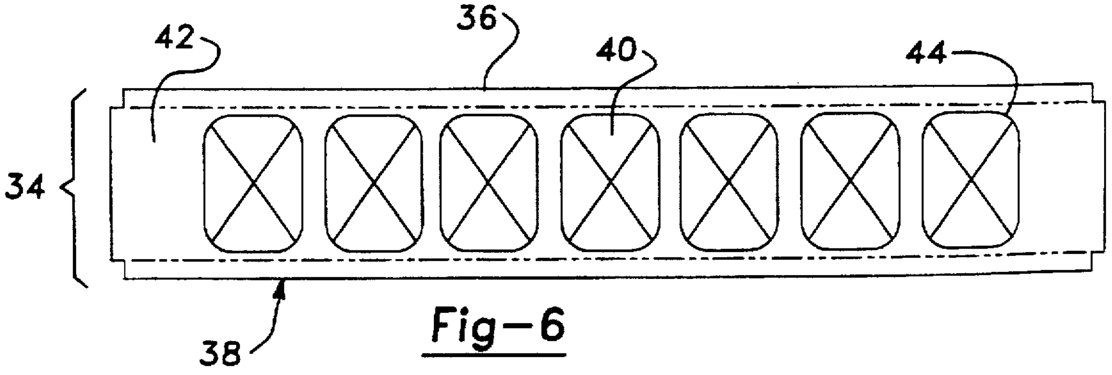
FIG. 6 is a plan view of a web according to the invention.

Turning to FIG. 3, the initial construction of the silencer panel can be seen. A U-shaped channel made of stainless steel is welded to form a periphery or frame 28 about the panel. This U-shaped channel will remain the outer periphery on the narrow edges of the panel and will be used to help mount the panel within the silencer chamber. The channel used to fabricate the upper edge of the panel may also have installed lifting nuts 30 which are threaded to allow easy attachment of cables to lift the assembled panel into and out of place at the final installation point. Within the outer periphery and helping to tie together the U-channel to form a framework 32 are webs 34. Turning to FIG. 6, these webs 34 are made of stainless steel and are welded to the U-channel at the periphery. The long edges 36 of the webs are bent over to provide additional attachment surface 38, as explained later. The web has openings 40 within it to minimize local thermal stresses. The large area of the web 42 will be adjacent to acoustical insulation which incidentally acts as thermal insulation. As a result, the edge forming the additional attachment surface 38 will be directly subject to exhaust gas through the cladding (discussed later) and hence the thermal cycling, while the large areas 42 will only be secondarily subject to the thermal cycling, being insulated by the acoustical insulation. Changes in temperature are initiated at the long edge 36 and attachment surface 38 and migrate from that edge internally. As a result, significant thermal gradients can be established from the outside edge 36 along the large area 42. By removing portions of the web material and leaving openings 40, the web can heat up faster in response to a given amount of heat from changing temperatures at the long edge 36, resulting in less of a gradient along the area 42 of the web. The web, however, must retain its structural integrity, as part of the framework 32. In order to retain structural integrity and allow for thermal expansion more than 50% of the area 42 is removed to achieve these functions. By more than 50% of the area, the surface area along the large internal sides of the web is referred to. The openings resulting from the removal of the material can be of many shapes and/or sizes, however, internal corners 44 of the opening 40 should be removed by generous radiusing to eliminate stress concentrations or stress risers.

Figure 4:
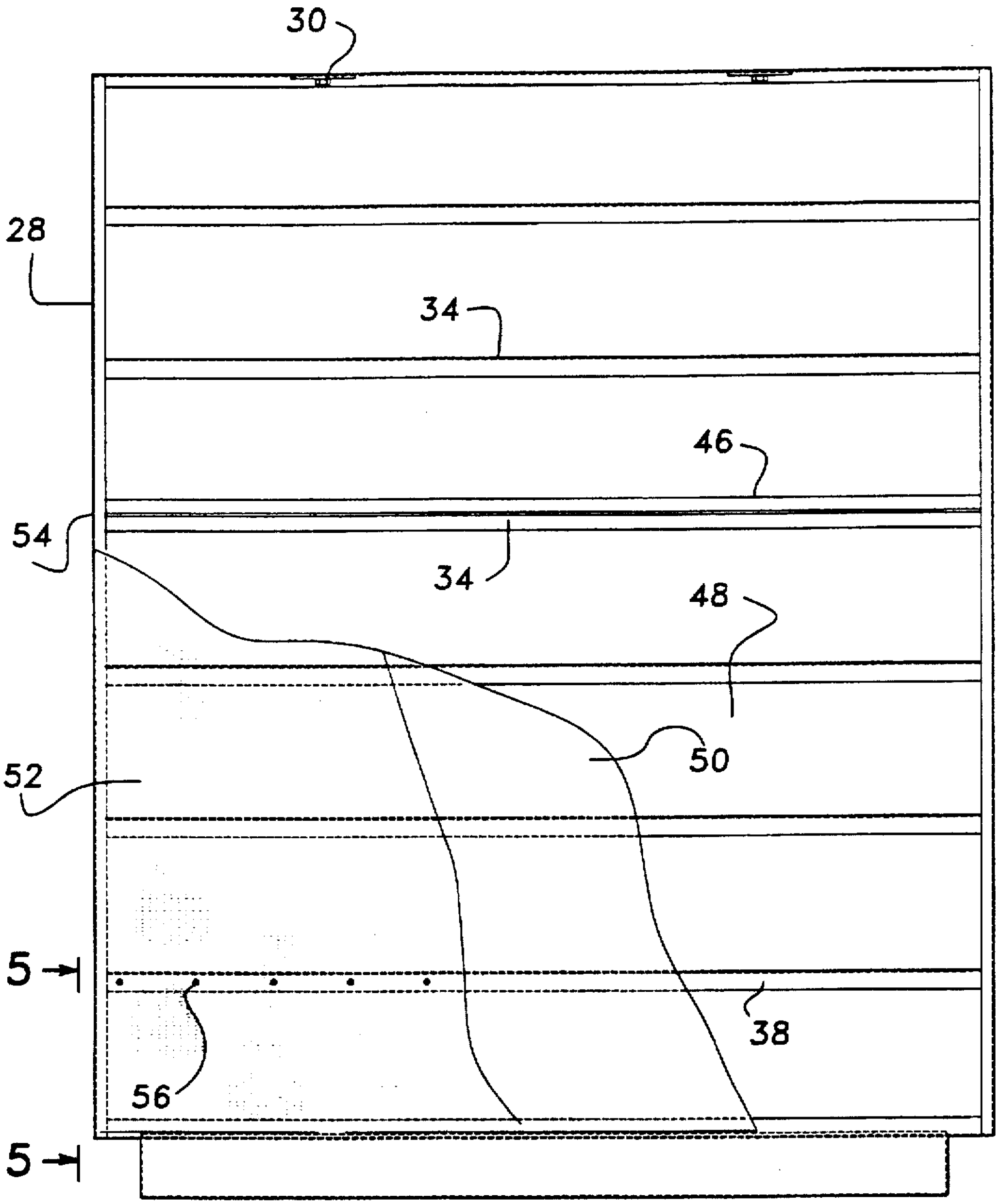
FIG. 4 is a perspective view of a partially assembled silencer panel according to the present invention.

As shown in FIG. 4, septums 46 in the form of stainless steel screening light gage solid sheet can be placed over the web 34. The function of the septum 46 is to keep the insulation within the silencer panel from shifting through the openings in the web. This can become of greater importance as the panel is subjected to use and embrittled acoustical insulation can break into smaller pieces. The septum is preferably free floating, i.e., not rigidly attached to any portion of the peripheral frame 28 or webbing 34. By allowing the septum to be free floating, thermal stresses due to the septum can be eliminated as it can freely expand or contract in all directions. The septum 46 can be integrated with the web 34 by using a heavier gauge screen with small openings. This serves to still minimize stress while also reducing movement of insulation. Such a combined septum-web cannot be free floating if it is to act as part of the framework.

Acoustical insulation 48 that will also be able to survive the hostile environment of the exhaust stream is placed within the silencer panel. Examples of acoustical insulation that are preferred are expanded ceramic fibers in a plurality of sheets, the sheets being on the order of 1½" thick and can be selected from a variety of densities. The fibers can be in the form of, for example, fiberglass, mineral wool or basalt fiber.

As shown in FIG. 5, depending on the thickness of the silencer panel, a dozen or more layers of insulation 48 may be placed parallel to one another within the panel 20 with the insulation being discontinuous across the web 34.

Returning to FIG. 4, after placement of the insulation inside, the insulation can be covered at the exposed faces with stainless steel screening 50 such as used for the septum. By way of example, the screening can be 40×40 stainless steel 0.0065" thick (0.165 mm). Over the screening and/or insulation cladding 52 is installed. Cladding 52 is preferably of perforated stainless steel sheets, such as perforated 14 gauge stainless steel. The cladding is supplied in panels and spot welded 56 at its center to the turned over edge or additional attachment surface 38 of the webbing. The cladding is preferably gapped between panel 54 prior to welding 58 at the periphery. The welding allows for thermal expansion without excessive structural integrity that could cause the panel to tear itself apart over repeated thermal cycling.

It is to be understood that the apparatus of the present will admit of other embodiments. The detailed description is given only to facilitate of the invention by those skilled in the art and should not be construed as limiting the invention.

What is claimed is:

1. An exhaust silencer system for use in a power generation system comprising:

a gas turbine for power generation in exhaust communication with exhaust ducting;

a silencer chamber capable of receiving a plurality of exhaust silencer panels in exhaust communication with said exhaust ducting;

at least one exhaust silencer panel capable of placement in said silencer chamber, said at least one silencer panel comprising:

a framework for receiving acoustical insulation;

a perforated web within said framework and attached to said framework for maintaining the structural integrity of said framework wherein said perforations comprise at least 50% of the non-exposed area of said web;

a septum within said metallic framework for restricting shifting of said insulation within said framework; and cladding for restricting movement of said insulation outside of said framework.

2. The exhaust silencer system of claim 1 wherein said septum is free floating.

3. The exhaust silencer system of claim 1 wherein said septum and web are integrated into a single screen.

* * * * *

UNITED STATES PATENT AND TRADEMARK OFFICE

CERTIFICATE OF CORRECTION

PATENT NO. : 5,715,672

DATED : February 10, 1998

INVENTOR(S) : Gene F. Schockemoehl; Leland M. Farabee; Thomas R. Mills; David W. Daniels It is certified that error appears in the above-indentified patent and that said Letters Patent is hereby corrected as shown below:

On the Title Page, under Attorney, Agent, or Firm "Dickney" should be -- Dickey --.

Column 1, line 64, "welded" (second occurrence) should be deleted.

Column 3, line 53, after "screening" insert -- or --.

Column 4, line 32, after "present" insert -- invention --.

Signed and Sealed this

Twenty-first Day of April, 1998

Attest:

BRUCE LEHMAN

*Attesting Officer*

*Commissioner of Patents and Trademarks*